Dec. 22, 1931.  W. O. HENSGEN  1,837,962
MANUFACTURE OF ELECTRICAL APPARATUS
Filed July 3, 1928  2 Sheets-Sheet 1

Inventor:
Walter O. Hensgen,
by Charles E. Mullan
His Attorney.

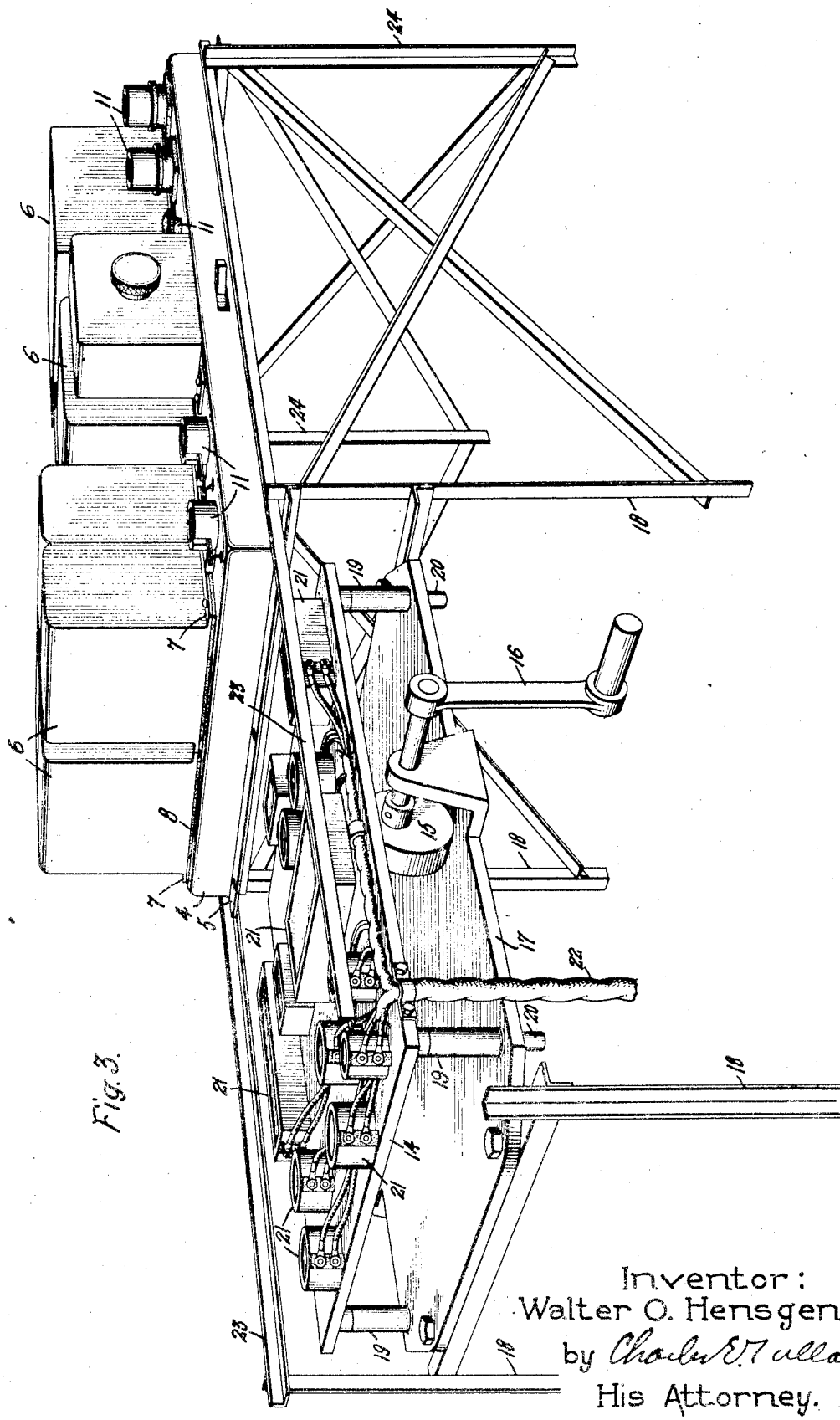

Patented Dec. 22, 1931

1,837,962

UNITED STATES PATENT OFFICE

WALTER O. HENSGEN, OF SCHENECTADY, NEW YORK, ASSIGNOR TO GENERAL ELECTRIC COMPANY, A CORPORATION OF NEW YORK

MANUFACTURE OF ELECTRICAL APPARATUS

Application filed July 3, 1928. Serial No. 290,258.

The present invention relates to the manufacture of electrical apparatus, and more particularly to mounting and connecting the component parts of such apparatus in assembled groups or units.

A group or unitary assembly is desirable in many types of electrical apparatus, particularly in apparatus involving related and interconnected parts such as radio apparatus and socket power units therefor. In apparatus of this character the component parts are ordinarily mounted on a common base and connected by wiring leading to the terminals of the parts, which last are often widely separated and exposed, together with the wiring. The labor and time involved in mounting the various parts and making a plurality of permanent wiring connections to such parts adds greatly to the cost of manufacture of apparatus assemblies, while the exposed wiring and terminals are undesirable from the standpoint of safety and appearance.

It is the principal object of the present invention to facilitate the assembling and wiring of a plurality of parts forming a unitary apparatus assembly, and to this end the terminals of the parts are grouped for easy and rapid wiring and an improved method is utilized for making permanent wiring connections with a plurality of such terminals by soldering or fusion. A further object is the provision of an improved apparatus wherein the different parts and wiring connections are hidden from view and protected from accidental contact.

The invention will be better understood from the following description when considered in connection with the accompanying drawings, and its scope will be pointed out in the appended claims.

Figure 2:
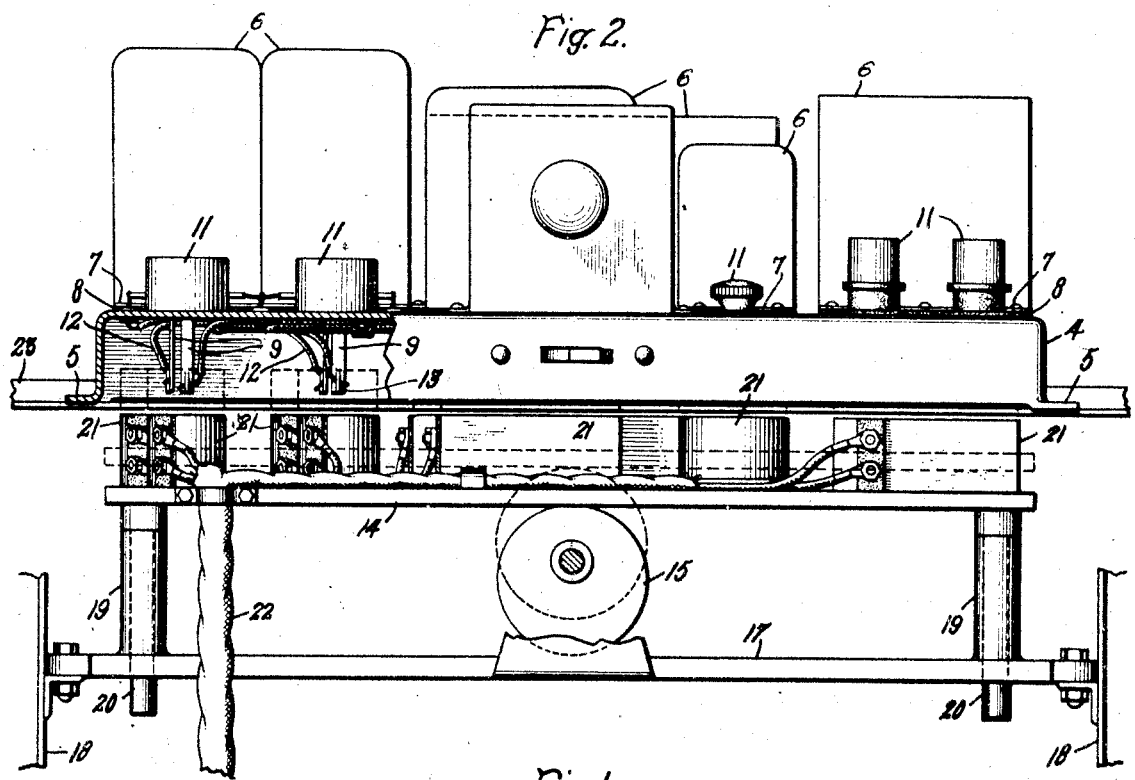
Figure 1:
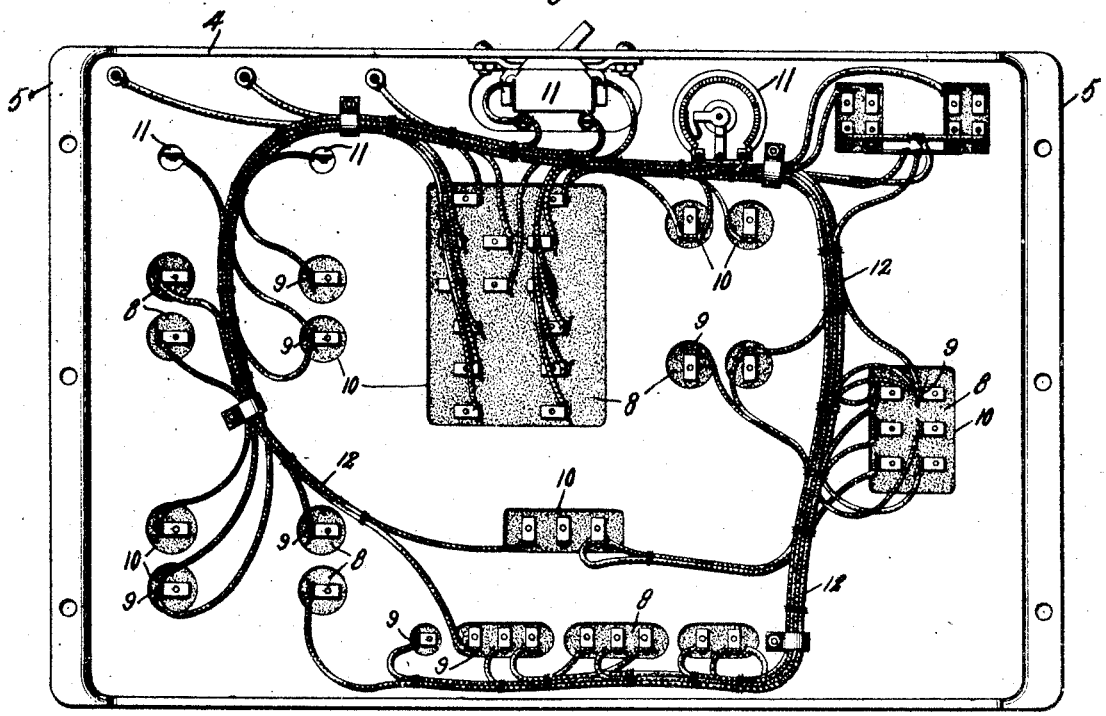

In the drawings, Fig. 1 is a bottom view of an electrical apparatus arranged and connected in accordance with the invention; Fig. 2 is a side elevation, partly in section, showing the apparatus of Fig. 1 mounted in operative relation to a terminal soldering means also partly in section; and Fig. 3 is a view in perspective with the apparatus removed from the soldering means showing the construction of the latter.

Referring to the drawings, 4 is a base having sides and ends bent down or otherwise formed to provide an enclosure with an open bottom. Perforated integral end flanges 5 serve as a mounting for the base. It is in shape an inverted shallow pan and is adapted to form a rigid mounting means for a complete apparatus assembly indicated in the present example by the parts of a radio power supply unit, and a protective means for the terminals and wiring therefor.

The individual parts are, in so far as is possible, mounted in sealed cans 6 having one end flanged as indicated at 7 and closed by an insulating strip 8 through which the terminals 9 project. The flanges facilitate mounting upon the base which is provided with suitable perforations or openings 10 arranged for receiving the terminals with a wide clearance about the latter. Other smaller parts 11, such as sockets, switches and rheostats, are also mounted on the base and either wired in groups or provided with terminals which extend into the base with their ends in the same plane as the ends of the other terminals.

The length of the terminals is such that when the parts are mounted on the base, they project downwardly into the enclosure formed by the base with their ends in substantially a common plane. With this arrangement the terminals are grouped beneath the base and may be easily and rapidly connected by relatively short wiring connections indicated at 12. The wiring and terminals are thus located within the confines of the base and protected from accidental contact, in addition to being out of sight, which gives the completed apparatus a neat appearance.

To facilitate making the terminal connections more rapidly, the terminals are provided with suitable means such as slits 13 in which the bared wire ends are caught, as indicated in Fig. 2, in readiness for soldering or fusion with the terminals for a permanent connection.

With a multiplicity of terminals, as indicated in the present example which is typical of the usual apparatus assembly of this character, the final operation of permanently securing each wire connection to its terminal ordinarily involves considerable time and labor. This is usually done by individually soldering each connection and in the present example could be done rapidly manually or individually since the connections are presented in a group on projecting terminals.

However, with the arrangement shown, in which the terminals all project at their connection ends into substantially a common plane, the soldering or fusion at the terminal ends may be done simultaneously to all by immersion in a solder bath. To do this the apparatus may be lowered over a solder bath to immerse the terminal ends and wire connections or the bath may be raised for the same purpose. To facilitate this operation with protection to the wiring 12, the bath is located in spaced relation to the plane of the connection ends of the terminals and the wiring ends are then brought down into this plane and connected with the terminals as shown more fully in Fig. 2.

In the present example as a preferred arrangement, the bath is raised on a carrier plate or tray 14 by a cam 15 which is rotated by any suitable means, such as a hand crank 16, Fig. 3. The tray and cam are carried by a suitable supporting structure 17 provided with legs 18 and guides 19 for pins 20 connected with the tray. The guides and pins are arranged to cause the tray to move in a vertical direction when actuated by the cam.

Mounted on the tray are a plurality of electrically heated solder wells 21, the electrical connections of which are indicated by cable 22. The wells are arranged to each receive a group of terminal ends when the tray is raised. Single wells for a group of terminals is preferable to a single solder bath for all terminals in that a lesser quantity of solder is required and a better temperature control is obtained, although a single well or bath may be used. Likewise other than electrical means may be utilized for heating the solder.

A runway or conveyor track is provided over the solder wells on which the apparatus units may be moved into position to be soldered. In the present example this comprises a pair of spaced angle irons 23, forming guide rails for receiving the apparatus base and on which the apparatus is guided from the position shown in Fig. 3 into position over the solder wells, as indicated in Fig. 2. The rails are supported by suitable means, such as legs 18 and auxiliary legs 24, and may extend in either direction for conveying the finished unit to and from the soldering operation.

The rails are located above the solder wells at such a distance that the terminals fully clear the latter when the tray is lowered fully as shown in Fig. 2. The throw of the cam indicated in the dotted position in Fig. 2, is such that the tray and solder wells are raised sufficiently to immerse and solder the wire ends to the terminals. The raised positions of the wells and tray are indicated in dotted outline in Fig. 2.

With this arrangement of terminals and soldering means, the soldering operation for a multiplicity of terminal connections, which in the present example is somewhat over fifty in number, requires less time than that required to solder one manually. In the manufacture of such units this method of assembly results in a very considerable saving in cost in the soldering item alone and in an additional saving, due to the simplified mounting and wiring arrangement.

What I claim as new and desire to secure by Letters Patent of the United States, is:

1. In an electrical apparatus, the combination of an inverted pan-shaped base forming a hollow enclosure with an open bottom, a plurality of apparatus units mounted above the base and having terminals in electrical connection with said units which project through the base into the enclosure formed thereby.

2. In an electrical apparatus, the combination of an inverted pan-shaped base forming a hollow enclosure with an open bottom, a plurality of apparatus units mounted on the base and provided with terminals in electrical connection with said units which project through the base into the enclosure formed thereby and have their ends arranged in a substantially common plane.

3. In an electrical apparatus, the combination of an inverted pan-shaped base forming a hollow enclosure with an open bottom, a plurality of apparatus units mounted on the base and provided with terminals in electrical connection with said units which project through the base into the enclosure formed thereby, said terminals being of such length that the ends thereof lie in substantially a common plane whereby wiring connections therewith may be made in substantially a single plane.

4. In an electrical apparatus, the combination of an inverted pan-shaped base forming a hollow enclosure with an open bottom, a plurality of apparatus units mounted on the base and provided with terminals in electrical connection with said units which project through the base into the enclosure formed thereby and have their ends arranged in substantially a common plane, and wiring located within the confines of the base in spaced relation to the plane of said ends of the terminals, said wiring having connection ends which project into said plane and connect with said ends of the terminals.

5. In an electrical apparatus, the combination of an inverted pan-shaped base forming a hollow enclosure with an open bottom, a plurality of apparatus units comprising sealed containers provided with flanged ends by which they are mounted on the base and with terminals projecting directly from the containers through the base into a common plane within the enclosure formed by said base, and wiring located within the confines of the base in spaced relation to said common plane, said wiring having connection ends which project into said plane and connect with said ends of the terminals.

6. In an electrical apparatus, the combination of an inverted pan-shaped base forming a hollow enclosure with an open bottom, and a plurality of apparatus units comprising sealed containers provided with flanged ends by which they are mounted on the base and with terminals at said flanged ends projecting directly from the container through the base into the enclosure formed by said base, said terminals being of such length that wiring connections therewith may be made in substantially a single plane.

7. The method of completing the connections of an apparatus provided with a plurality of electrical terminals which includes bringing the ends of said terminals into substantially a common plane, placing wiring terminals in contact therewith, and causing relative motion of said terminals and a solder bath as a whole, to immerse said terminals in said solder bath to unite said terminals.

8. The method of completing the connections of an apparatus provided with a plurality of electrical terminals which includes bringing the connection ends of said apparatus terminals into substantially a common plane, placing wiring connections in spaced relation to said plane, bringing the terminal ends of said wiring connections into said plane and into electrical contact with the ends of said apparatus terminals, and causing relative motion of said ends and a solder bath as a whole, to immerse said ends in said solder bath to unite said ends.

In witness whereof, I have hereunto set my hand this 2nd day of July, 1928.

WALTER O. HENSGEN.